United States Patent
Kirschbaum et al.

[11] Patent Number: 5,873,616
[45] Date of Patent: Feb. 23, 1999

[54] APPARATUS FOR LIFTING CONTAINERS

[75] Inventors: Bradley Jerome Kirschbaum, Corona, Calif.; Alexander Sirotkin, Short Hills, N.J.

[73] Assignee: Rapid Industrial Plastics Co., Inc., Jersey City, N.J.

[21] Appl. No.: 892,597

[22] Filed: Jul. 15, 1997

[51] Int. Cl.$^6$ ........................................... B65G 7/12
[52] U.S. Cl. .................... 294/159; 294/150; 294/154
[58] Field of Search .................... 294/146, 149, 294/153, 154, 155, 157, 159, 160, 170, 137, 87.1, 87.2; 206/150, 162; 220/754, 770

[56] References Cited

U.S. PATENT DOCUMENTS

| | | | |
|---|---|---|---|
| 899,806 | 9/1908 | Rieder | 294/170 |
| 1,137,909 | 5/1915 | Rusfeldt | 294/159 |
| 1,498,247 | 6/1924 | Stewart | 294/159 |
| 2,676,836 | 4/1954 | Raphael | 294/159 |
| 2,747,914 | 5/1956 | Lyons | 294/87.1 |
| 2,970,729 | 2/1961 | Allen | 294/149 |
| 3,251,622 | 5/1966 | Miller | 294/159 |
| 4,623,184 | 11/1986 | Houston . | |
| 4,678,221 | 7/1987 | Josenhans | 294/170 |
| 5,697,660 | 12/1997 | Smetz | 294/159 |

FOREIGN PATENT DOCUMENTS 2271986 12/1975 France ................................. 294/159

*Primary Examiner*—Dean Kramer
*Attorney, Agent, or Firm*—Lieberman & Nowak, LLP

[57] ABSTRACT

An apparatus for lifting and transporting large containers capable of lifting and transporting large containers being arranged proximate each other to define a space comprises a body portion capable of being manipulated for lifting; and a plurality of flexible strands, each strand for engaging a respective large container and extending from the body portion in a common direction and each strand having an end portion including an engaging device for engaging a receiving portion of a corresponding large container, wherein each of the large containers are arranged such that each receiving portion faces the space, and the lifting and transporting of the large containers is directed from above the space.

2 Claims, 3 Drawing Sheets

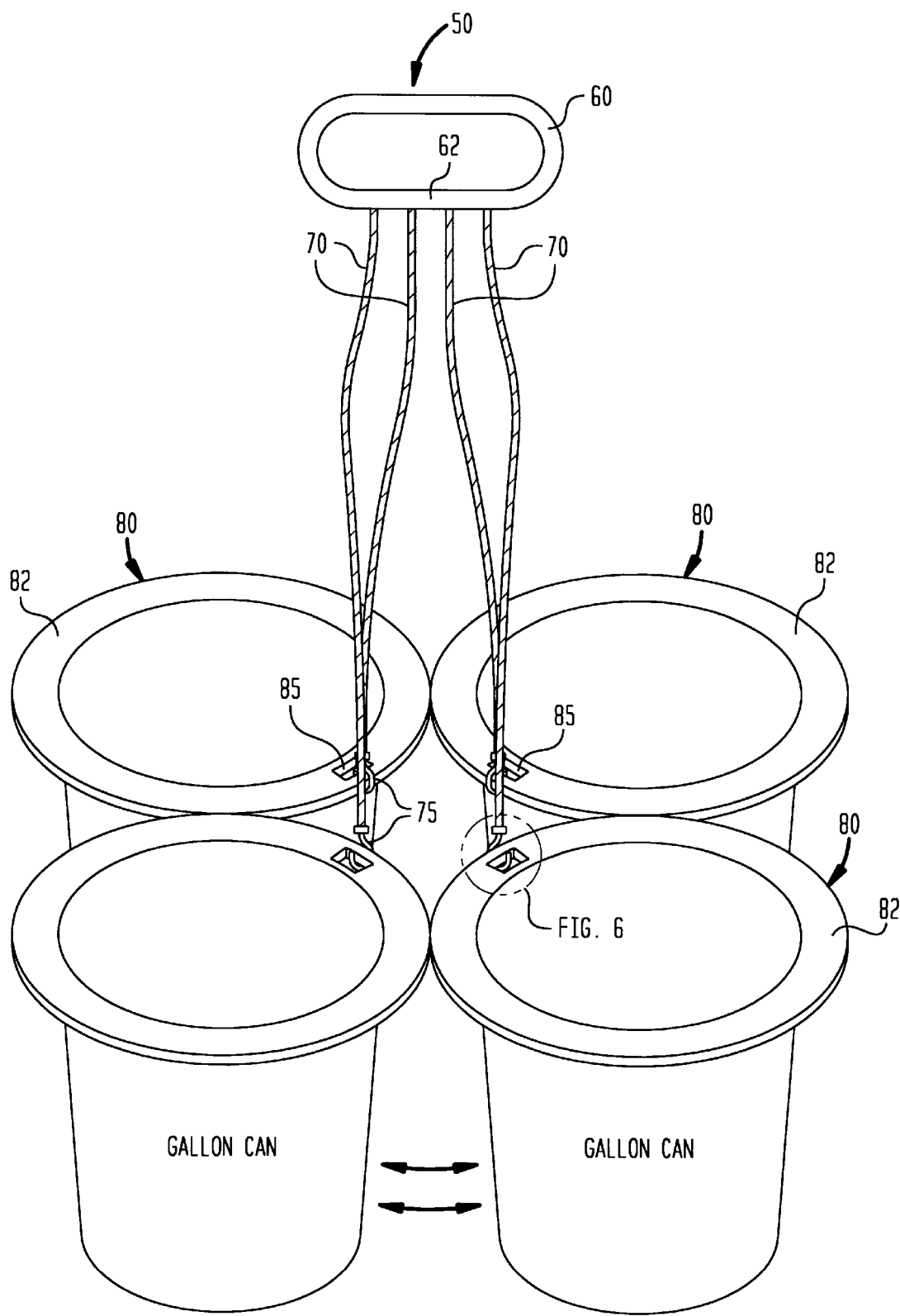

APPARATUS FOR LIFTING CONTAINERS

FIELD OF THE INVENTION

The present invention relates generally to container lifting devices, and particularly, to a handle apparatus for lifting and transporting multiple container units, such as large flower pots.

BACKGROUND OF THE INVENTION

Currently, in the horticultural industry, nurserymen employ injection molded and thermoformed plastic trays to transport multitudes of flower pots in a variety of sizes and shapes, e.g., large and small, round and square, etc. The trays and pots, for example, enable the nurseryman to perform the following functions: 1) fill pots with growing media, i.e., soil, usually on a moving belt; 2) transplant plugs or cuttings into the pots; 3) transport many such filled pots to growing areas (in the greenhouse, for example) and back again to a staging area for sorting and picking; 4) transplant the mature plants via truck (on racks or carts often) to the market place, e.g., retail nurseries; and, 5) display plants at the market place.

Generally, trays come in two types, shuttle trays and carrying trays, with each designed for entirely different purposes. FIG. 1 illustrates a side cross-sectional view of a shuttle tray 20 having multiple cavities 28 designed to accommodate the particular size flower pot indicated as pot 25. There are many different sized shuttle trays for different sized round flower pots, with the cavities 28 of each matching the size of the flower pot. Shuttle trays are designed to enable automatic filling of flower pots 25 with, e.g., soil, by special machinery, and soil is confined to the pots by virtue of the shuttle tray design which enables tops 26 of the pots 25 to be flush with the top surface 29 of the tray.

Carrying trays, such as the tray 30 shown in FIG. 2, are typically open with no interior divisions and are thus less conducive to automatic filling of soil, as soil tends to spill over during the filling process. These are primarily used for carrying and transporting pots short distances, e.g., at a retail store.

Another type of flower pot carrying or transporting device is a sheet of rings (not shown) designed to accommodate a certain size pot. The number of pots carried depends on the size of the container and tray and are usually formed by injection molding techniques to provide strength and longevity. There are some ring type carriers that allow multiple pots to be hung, e.g., for decorative and aesthetic purposes. These types are typically designed for carrying smaller pots, (typically 4" or less in diameter) and comprise a ring type carrier with a hanger attached.

As shown in FIG. 3(a), the shuttle trays 20 are designed to engage with attachable or affixed plastic strap handles 40 which trays may be used for transport at the plant nursery and which strap handles are typically used to encourage retail sales of multiple flower pots. As shown in FIG. 3(b), a simple engagement mechanism may be used to attach the handle 40 to the tray frame, such as, e.g., providing an opening 21 in an upper surface 29 at opposite ends of the tray 20, and inserting a tapered portion 45 that is shaped as an arrow and provided at each end of the plastic handle 40 into a respective opening in a manner so as the opening and the tapered portion of the handle are engaged. Of course, there exists other similar-type designs for attaching a handle to the shuttle or carrying tray. Usually, the types of "handled" trays as described shown herein are exclusively used for carrying smaller flower pots, i.e., below the size of "one gallon" size cans or pots. This is because these types of handled trays are not as structurally sound to accommodate larger flower pots and would be extremely awkward and heavy. Moreover, the carrying mechanisms used to transport and retail the smaller pots would not work in the transport of larger pots because trays and strap handles might break given present designs and material choices. To successfully transport, carry and/or retail multiple larger pots would require heavier, more rigid and ultimately costlier trays and handles.

U.S. Pat. No. 4,623,184 describes a container handling apparatus that utilizes a plurality of fingers for lifting an arrangement of containers. The container handling apparatus described is complex as it utilizes a plurality of interconnected linkages for operating gripping fingers designed to grip an arrangement of small diameter containers.

It would thus be highly desirable to provide a plant flowerpot handle that facilitates the easy handling, lifting and transporting of several large open end containers, e.g., flower pots.

Additionally, it would be highly desirable to provide a plant flowerpot handle that will be able to easily handle and transport a multitude of one or two gallon container sized flower pots that are used each year for flowering annuals, perennials, tropicals, small trees and shrubs and other plants.

SUMMARY OF THE INVENTION

The instant invention is a handle apparatus capable of lifting and transporting three or more large flower pots, particularly, of one gallon size or greater. The handle apparatus is directed to lifting an arrangement of containers having an engaging means formed in an upper portion of the container comprises a plastic body portion and a plurality of strands extending from the body portion, each strand having an end portion including a clip means for engaging a corresponding engagement opening formed at an upper rim portion of a large flower pot, the arrangement enabling lifting of the plurality of containers and transportation between first and second locations.

Advantageously, when the large containers are tapered, the lifting action of the handle forces the containers to tilt toward one another at the bottoms of the containers and to support each other at a point of contact. The lifting action of the handle enables the tops of the containers to tilt away from each other which protects the plants from being entangled within one another or coming in contact with one another so as to injure the plants. The handling apparatus may be designed to enable the provision of a space within the arrangement of large containers to protect the plants from such injurious contact.

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention.

BRIEF DESCRIPTION OF DRAWINGS

FIG. 4 is an illustration of the container lifting apparatus of the invention.

DETAILED DESCRIPTION OF THE INVENTION

Figure 1:
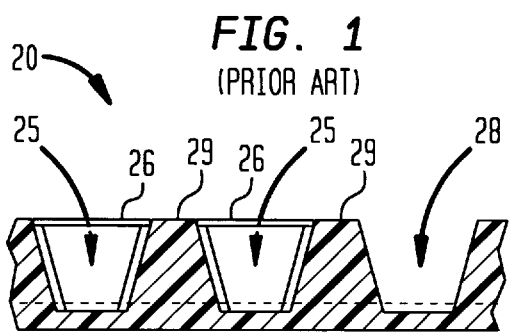
FIG. 1 illustrates a typical shuttle tray.

The invention is an apparatus 50 for simultaneously lifting and transporting a plurality of large, open-end containers such as flower pots. As shown in FIG. 4, the apparatus 50 comprises a handle portion 60, and at least three or more flexible strand portions 70 that are molded substantially in line, and formed integrally with and depending from the bottom 62 of handle portion. Handle portion 60 is ergonomically designed for a human hand to grip and manipulate, and preferably is of one-piece, rectangular-shaped plastic form. As shown in FIG. 4, the strand portions 70 are of identical length and typically range in length from 4.0 inches to 12.0 inches, so long as the strand does not destructively interfere with the plant or flower life that is being grown in the soil contained in the container, and are of uniform width. Alternatively, the application may require the strands 70 to be of different lengths to accommodate lifting and transporting containers having plants or flowers of varying heights. Thus, the skilled artisan may determine the necessity to slightly modify the thickness and length dimensions of a strand depending upon the application. Preferably, the apparatus 50 including handle 60 and strand portions 70 are preferably plastic, however, wire may be used as well. Preferably, the plastic is of high-density polyethylene or polystyrene or other like suitable plastic material, and manufactured by known injection molding techniques. It should be understood that the strand portion dimensions and materials renders the apparatus 50 capable of carrying loads of up to fifty lbs., e.g., at least the equivalent of up to six, soil- and plant-filled containers. One of the most popular size pots used in the horticultural industry today is the "one gallon can" or "one gallon" sized pot which are currently injection or blow molded plastic and typically hold a volume of approximately 0.6324 U.S. gallons (approximately 146 cubic inches).

Figure 6:
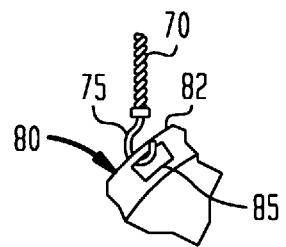
FIG. 6 is a detailed view of the clip engaging means.
Figure 2:
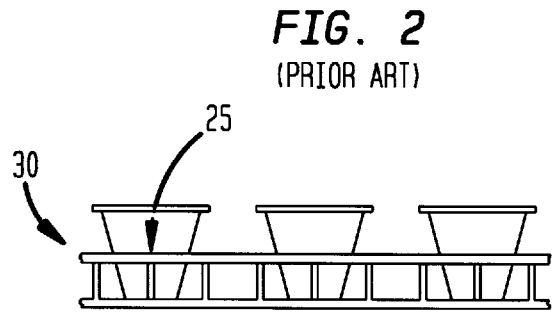
FIG. 2 illustrates a typical carrying tray.
Figure 3A:
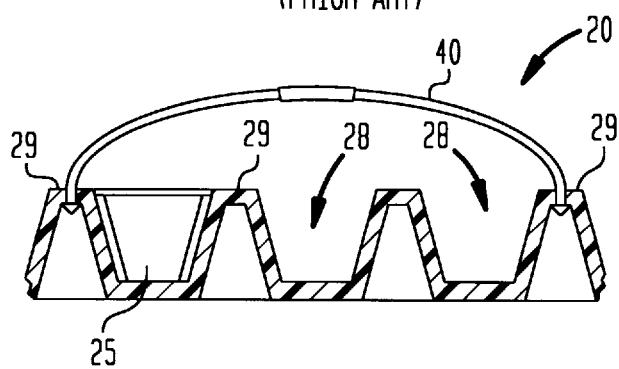
FIG. 3(a) is an illustration of a typical shuttle tray having a handle.
Figure 3B:
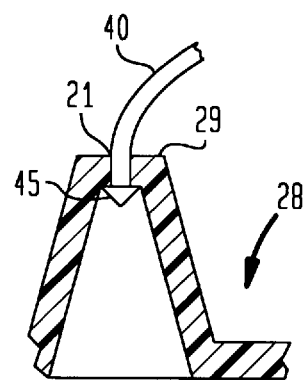
FIG. 3(b) is a detailed view of a mechanism for attaching the handle portion to the tray surface.

As shown in FIG. 4, there is provided at each end of a respective strand 70 is a clip 75 or similar engagement device 75 that will engage a corresponding slot 85 formed at an upper lip or edge portion 82 of the container in a gallon container 80. A detailed view of this type of locking mechanism is shown in FIG. 6 but it should be understood that many other types of locking mechanisms may be employed to lock a strand 70 of apparatus 50 with a respective container. In the preferred embodiment, each strand will correspond to one container that it is to lift.

Figure 5A:
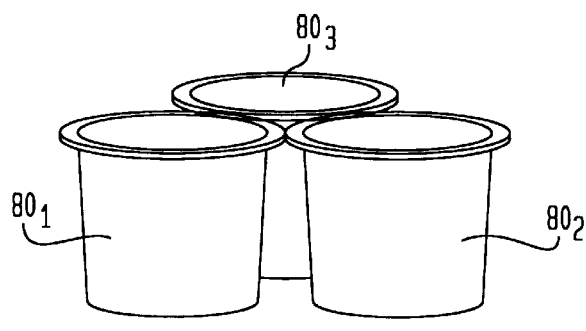
FIG. 5(a) illustrates an arrangement of containers to be lifted.
Figure 5B:
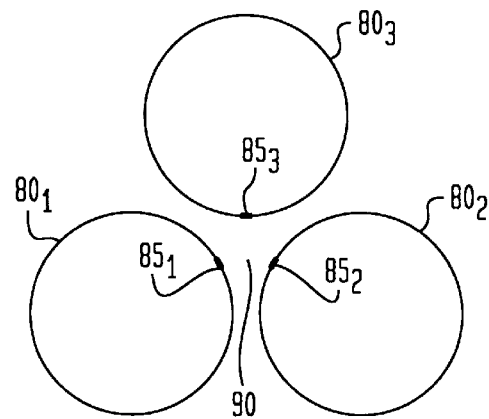
FIG. 5(b) illustrates at top view of the containers shown in FIG. 5(a).
Figure 5C:
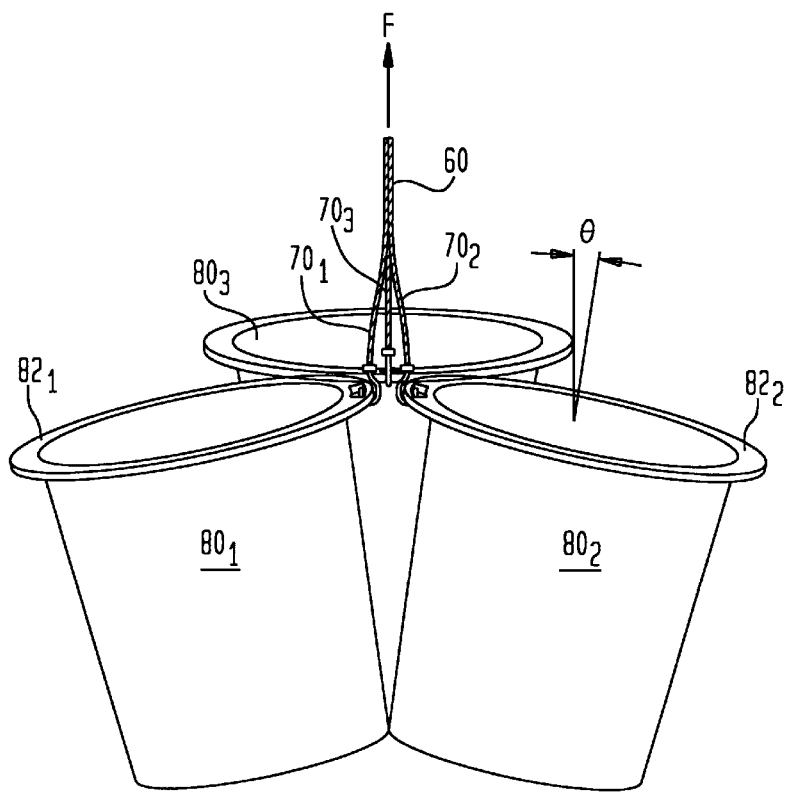
FIG. 5(c) illustrates the containers being lifted by the apparatus of the invention.

In operation, as shown in FIG. 5(a), three or more of the gallon containers, depicted as containers $80_1$, $80_2$ and $80_3$, that are to be lifted are arranged proximate each other such that their respective slots $85_1$, $85_2$, and $85_3$, formed in their respective lip portions, confrontingly face each other in a space 90 defined between the containers as shown in the top view of the containers in FIG. 5(b). Then, the clip portion 75 of each of the strands are affixed to engage a respective container. As shown in FIG. 5(c), three strands $70_1$, $70_2$ and $70_3$ of apparatus 50 will engage the containers and, by manipulating the handle apparatus 50 in the direction indicated by force "F" the three containers may simultaneously lifted and transported. Thus, as shown in the side view of FIG. 5(c), the handle, when lifting, is maintained in an upright position with the strands 70 being flexible to engage each respective container 80. As shown in FIG. 5(c), the containers $80_1$, $80_2$ and $80_3$, are tapered, i.e., have a larger diameter top end than the bottom end. In such an instance, when the handle apparatus lifts them in the direction as shown in FIG. 5(c), the containers will contact and supportively bias each other at a point 95 located near the bottom of each of the three containers. Additionally, as shown in FIG. 5(c), when tapered containers are being lifted, consequently, the containers will be angled in a manner such that any plant or growth planted in the container and extending over the top lip portion 82, will be angled away from each other, e.g., by an angle θ as shown in the FIG.5(c), which may range between 2° to 8°.

To the extent that the containers 80 are slightly tapered, the containers will be supported in the vertical direction, keeping plant and soil within the container while being carried.

It should be understood that the handle apparatus 50 may be used to lift and carry containers of sizes greater than one-gallon size, and may easily provide support and lift of, e.g., two (2) gallon and five (5) gallon size containers, whether tapered or not. Furthermore, three or four of such containers may be easily lifted at once. Advantageously, the handle apparatus 50 is conducive to the carrying, transport and retail of the larger containers because it performs these functions both successfully and economically. Consequently, employment of the handle apparatus 50 at the retail level encourages the sale of larger flower parts in multiple units.

The foregoing merely illustrates the principles of the present invention. Those skilled in the art will be able to devise various modifications, which although not explicitly described or shown herein, embody the principles of the invention and are thus within its spirit and scope.

What is claimed is:

1. Apparatus for transporting plants contained in containers, said containers being arranged proximate each other to define a space therebetween, each of said containers including a horizontal flange portion extending circumferentially around an outside diameter of the top of the container, said flange portion including a slot formed in said flange portion, the apparatus comprising, a handle portion capable of being manipulated for simultaneously lifting a plurality of said containers, a plurality of flexible strand means extending from said handle portion in a common direction, and each flexible strand means having an end portion including an engaging means for engaging said slot of a corresponding container, each of said containers, when transported, being arranged such that each slot included in said flange portion faces said space.

2. Apparatus for transporting plants in accordance with claim 1, wherein said containers are tapered such that said containers, when lifted for transport, tilt away from one another at a predetermined angle.

* * * * *